Feb. 12, 1946.   G. H. STEPHENS   2,394,947
VARIABLE CONDENSER
Filed Jan. 28, 1943

Inventor
G. H. Stephens
By Benjamin J. Wupper
Atty.

Patented Feb. 12, 1946

2,394,947

UNITED STATES PATENT OFFICE 2,394,947

VARIABLE CONDENSER

George H. Stephens, Glencoe, Ill., assignor to Hammond Instrument Company, Chicago, Ill., a corporation of Delaware Application January 28, 1943, Serial No. 473,773

3 Claims. (Cl. 64—1)

My invention relates generally to variable condensers, and more particularly to variable condensers of the rotary plate type.

It is extremely desirable that, in variable condensers of the rotary type, such as used as tuning condensers in radio transmitters and receivers, the torque necessary for causing rotation be uniform, that there be a minimum of difference between the torque necessary to overcome static friction and that necessary to overcome the friction during movement, and that there be no radial clearance in the bearings.

The matter of the construction and design of the bearings for the rotor shafts of condensers of this type has therefore received a great deal of consideration, and various expedients have been proposed and used. Among such expedients is the use of a single ball forming the bearing for one end of the shaft and an annular (radial) ball bearing assembly as the support for the other end of the shaft. In order that there may be no longitudinal movement of the shaft and that there may be sufficient friction to prevent accidental rotation of the rotor shaft due to vibration, etc., it has been found desirable to adjust one bearing relative to the other such as to take up all play longitudinally of the shaft and to provide the force necessary to secure such friction.

In condensers constructed as above described, difficulty has been encountered due to the fact that the friction in the annular ball bearing assembly is not uniform, due probably to unavoidable inaccuracies in the alignment of the two bearings and to minor irregularities in the ball race surfaces, or due to the presence of dirt in the ball bearing assembly. As a result, the torque required to rotate the rotor would vary considerably, depending upon its position, and there would often be considerable discrepancy between the torque required to overcome static friction and the torque required to cause continued uniform rotary motion. These disadvantageous features were naturally reflected in the increased difficulty in adjusting the radio transmitter or receiver to the required frequency.

To overcome these difficulties I have provided an improved variable condenser construction in which each end of the rotor shaft is provided with a single ball bearing forming a thrust or pivot bearing, and sufficient thrust is applied longitudinally of the rotor shaft against these bearings to cause the shaft to align itself accurately with the bearing sockets, and to provide sufficient friction to prevent accidental movement of the rotor under the influence of vibration, etc.

It is thus an object of my invention to provide an improved variable condenser of the rotary plate type which is simple in construction, has improved rotor bearings, and which may be economically manufactured.

A further object is to provide an improved variable plate type condenser having a rotor shaft the extremities of which are provided respectively with single ball thrust pivot bearings, and in which adjustment of the rotor is effected by a shaft in alignment with the rotor shaft and rigidly connected thereto.

A further object is to provide an improved variable condenser which may be easily and accurately adjusted to the required position, and which will remain in adjusted position even when subjected to vibration of substantial amplitude.

A further object is to provide an improved operating connection for variable condensers of the rotary plate type by which the condenser may be easily adjusted, and which will maintain its adjustment.

A further object is to provide an improved variable condenser in which radial clearance in the bearings of the rotor shaft is eliminated, and in which a control shaft is rigidly connected to the rotor shaft.

Other objects will appear from the following description, reference being had to the accompanying drawing in which.

Figure 1:
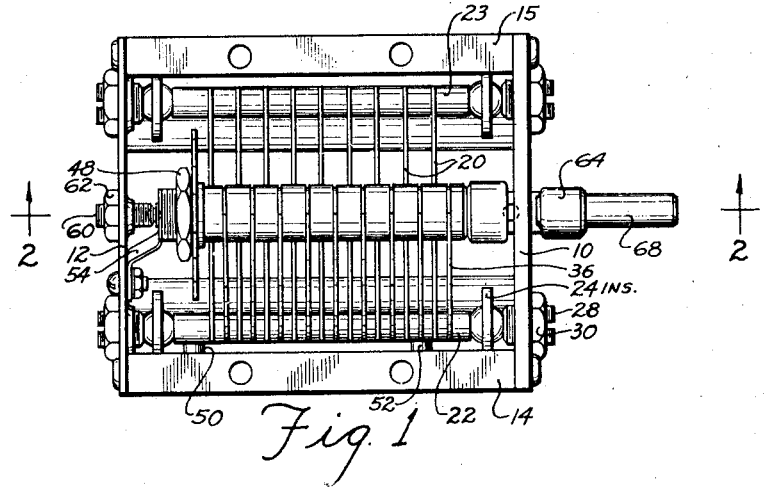
Figure 1 is a plan view of the variable condenser.
Figure 2:
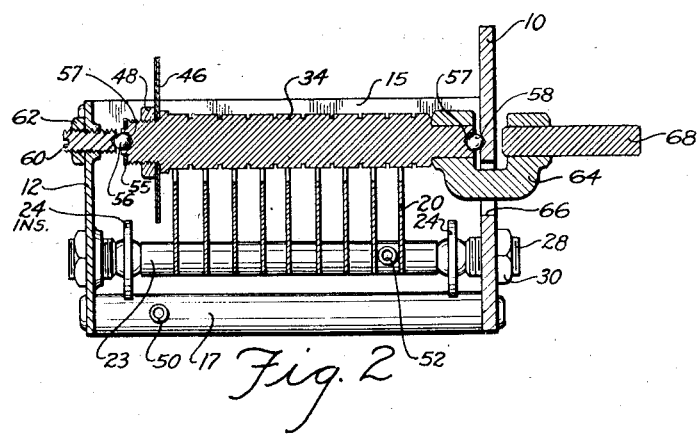
Figure 2 is a central vertical sectional view thereof taken on the line 2—2 of Fig. 1.
Figure 3:
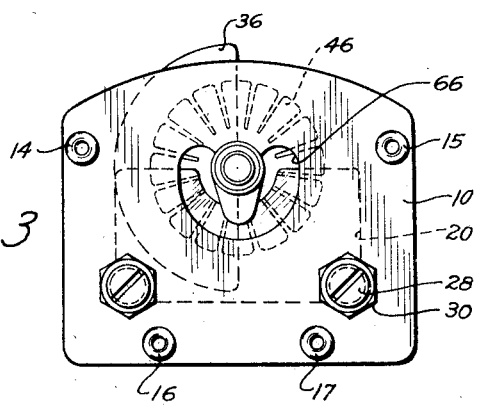
Figure 3 is a front end elevational view.

The condenser comprises a relatively heavy front plate 10 and a back plate 12 joined by posts 14, 15 and 16, 17, the ends of which are riveted respectively to the front plate 10 and the back plate 12. Stator plates 20 are suitably secured in spaced relation to a pair of stator plate support rods 22, 23, as by soldering, welding, or the like. The ends of the stator supporting rods 22 and 23 have depressions formed therein to receive the spherical portions of insulating elements 24 which are preferably of suitable ceramic composition molded to a Saturn shape. The insulating elements 24 likewise engage in the hollow ends of adjusting screws 28 which are threaded in the front plate 10 and the back plate 12 respectively, the screws 28 being locked in adjusted position by lock nuts 30.

The rotor of the condenser comprises a shaft 34 which is provided with suitable positioning grooves to receive rotor plates 36. The rotor plates 36 are suitably soldered to the rotor shaft 34 so as to be rigid therewith.

A radially slotted bimetal disc 46 is secured to the shaft 34 to provide temperature compensation. The disc 46 may be held in position on the shaft 34 by a nut 48.

The electrical connections to the frame and rotor plates of the condenser may be provided by a conductor soldered in a socket terminal 50 which is soldered to the post 17. A similar socket terminal 52 is soldered to the rod 22 to provide for a connection to the stator plates. The rotor plates are maintained in electrical connection with the frame by a suitable leaf spring 54 which is secured to the back plate 12, and has an eye portion 55 resiliently pressed against the end face of the shaft 34.

The shaft 34 has a central shallow socket 57 formed in each end thereof, the diameter of the socket being such that balls 56, 58 will be retained therein due to a press fit, with a substantial portion of each of these balls projecting from the socket. The ball 58 rests in a conical depression formed in the front plate 10, while the other ball 56 rests in a conical depression formed in the end of a screw 60 which is threaded in the back plate 12 and may be held in adjusted position by a lock nut 62. All of the adjusting screws and lock nuts preferably are prevented from coming loose by the application of a cementing coating of a varnish or lacquer.

The end of the rotor shaft 34 adjacent the front plate 10 is of reduced diameter and has one arm of a U-shaped bracket 64 secured thereto by a press fit, the U-shaped bracket projecting through an arcuate slot 66 formed in the front plate 10 and having an operating stub shaft 68 secured in its other arm as by a press fit, with the shaft 68 in accurate axial alignment with the rotor shaft 34.

The slot 66 is sufficiently large to permit the passage of the stub shaft 68 and the bracket 64 during assembly, and is of sufficient arcuate extent to permit the required rotary movement of the rotor assembly during normal use of the condenser.

Due to the construction of the end bearings for the rotor shaft 34, the shaft is, in effect, self-aligning, and the frictional torque opposing rotation of the rotor is very uniform. Since the balls 56, 58 do not roll, the possibility of dirt getting between the contacting bearing surfaces is substantially eliminated. The contacting surfaces between the balls and the conical bearing sockets is very small, being substantially a line contact, so that minor irregularities in the contacting surfaces will not have any appreciable effect upon the bearing friction. Since the balls 56, 58 are preferably made of hard steel, the end plate 10 made of brass or Invar, and the adjusting screw made of soft steel or hard brass, it will be apparent that, due to a burnishing effect, any slight irregularities in the surfaces engaged by the balls 56, 58 will be quickly smoothed out.

The provision of the bracket 64 projecting through the slot 66 in the front plate 10 makes it possible to use the single ball thrust bearings at both ends of the rotor shaft without sacrificing the rigidity of connection between the rotor shaft and the control. The complication of a gear or similar drive between these two parts is thus avoided in a simple and economical manner.

The bracket 64 is preferably made as a forging of naval bronze, or similar material, and thus provides a strong and rigid connection between the control shaft 68 and the rotor shaft 34.

While I have disclosed herein but a single exemplary form of the invention, it will be apparent to those skilled in the art that it may be embodied in various modified forms all coming within the scope of the following claims.

I claim:

1. A rotary variable condenser comprising a frame having an end plate with an arcuate opening therein, a rotor shaft having its ends supported by said frame on pivot and end thrust bearings, one of said bearings being in said end plate adjacent the opening therein, a control shaft, and a generally U-shaped member rigidly connecting said shafts in spaced coaxial relationship, said member extending through the opening in said end plate.

2. A rotor shaft structure for rotary variable condensers, comprising a rotor shaft, a hardened steel ball fixed in each end of said shaft at the center thereof, a control shaft, and a U-shaped member rigidly joining said shafts in axial alignment with their adjacent ends sufficiently far apart to provide space for a bearing for the ball in the end of said rotor shaft.

3. A rotor shaft structure for rotary variable condensers comprising, a rotor plate supporting portion having pivot and end thrust bearings at the ends thereof, a control portion, and a generally U-shaped portion rigidly joining said plate supporting portion and said control portion in axial alignment with their adjacent ends separated sufficiently to provide space for a bearing part cooperating with the bearing at said end of the rotor plate supporting portion.

GEORGE H. STEPHENS.